United States Patent Office 3,462,426
Patented Aug. 19, 1969

3,462,426
3 - (3 - OXO - 11β,13β-DIALKYL-17β-HYDROXY-GONEN - 17α - YL) PROPIONIC ACID γ-LACTONES AND INTERMEDIATES
John S. Baran, Morton Grove, Ill., assignor to G. D. Searle & Co., Chicago, Ill., a corporation of Delaware
No Drawing. Filed Oct. 30, 1967, Ser. No. 679,223
Int. Cl. C07c *173/00, 169/10;* A61k *17/00*
U.S. Cl. 260—239.57                                      3 Claims

ABSTRACT OF THE DISCLOSURE

3 - (3 - oxo - 11β,13β - dialkyl - 17β - hydroxygonen-17α-yl) propionic acid γ-lactones useful as potent progestational agents lacking sodium-excreting side-effects and preparable from the corresponding 11β,13β - dialkyl-17α - ethynylgona - 1,3,5(10) - triene - 3,17β-diols by reaction of the latter materials with carbon dioxide followed by reduction of the acetylenic linkage, Birch reduction of the A-ring and hydrolysis of the resulting enol function.

---

The present invention relates to novel steroidal derivatives characterized by an 11-alkyl and a 17-spirolactone substituent and, more particularly, with 3-(3-oxo-11β,13β-dialkyl - 17β - hydroxygonen - 17α - yl) propionic acid γ-lactones represented by the following structural formula

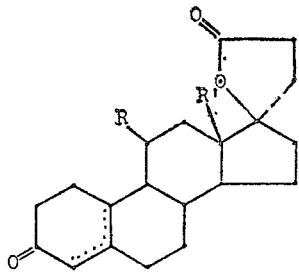

wherein R and R' are lower alkyl radicals and the dotted line indicates an alternative 4(5) or 5(10) double bond.

The lower alkyl radical encompassed by the R and R' terms are typified by methyl, ethyl, propyl, butyl, pentyl, hexyl, heptyl and the branched chain group isomeric therewith.

The compounds of this invention are conveniently manufactured by utilizing as starting materials the 17α-ethynyl-17β-hydroxy substances of the following structural formula

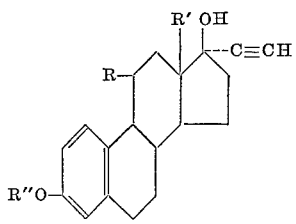

wherein R and R' are as defined hereinbefore and R'' is hydrogen or a lower alkyl or

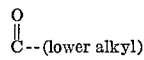

group. Those materials together with methods for their manufacture are described in U.S. Patent 3,299,108, which issued Jan. 17, 1967. Conversion of those substances to the corresponding ethynyl Grignard derivative by reaction with a suitable Grignard reagent such as methyl magnesium bromide followed by a reaction with carbon dioxide affords the corresponding propiolic acid derivative. Those intermediates are catalytically reduced to yield the corresponding saturated hydroxy-acid, which spontaneously cyclizes to afford the corresponding γ-lactone. Those processes are specifically illustrated by the reaction of 17α - ethynyl - 11β - methylestra-1,3,5(10)-triene-3,17β-diol 3-methyl ether with methyl magnesium bromide, carboxylation of the resulting Grignard derivative by reaction with carbon dioxide, thus affording 17β-hydroxy - 3 - methoxy - 11β - methylestra - 1,3,5(10)-trien-17α-yl propiolic acid, and catalytic hydrogenation of the latter substance in methanol with a 5% palladium-on-carbon catalyst at atmospheric pressure and room temperature to yield 3 - (17β - hydroxy - 3 - methoxy-11β-methylestra 1,3,5(10)-trien-17α-yl) propionic acid, which spontaneously cyclizes to yield the corresponding γ-lactone.

The instant A-ring monoenoic lactones are produced by first submitting the aforementioned gona-1,3,5(10)-trienes to the Birch reduction, i.e., reaction with an alkali metal, such as sodium, potassium or lithium, and liquid ammonia. The resulting 2,5(10) dienoic product is hydrolyzed with acid under mild conditions to afford the instant Δ⁵⁽¹⁰⁾ lactones, while reaction under more vigorous conditions results in the instant Δ⁴ derivative. As a specific example, 3 - (17β - hydroxy - 3 - methoxy-11β-methylestra - 1,3,5(10)-trien-17α-yl) propionic acid is converted to the sodium salt of the corresponding hydroxy-acid and that material is allowed to react with lithium in liquid ammonia containing tetrahydrofuran and tertiary-butyl alcohol, thus affording the corresponding estra-2,5(10)-diene. Reaction with dilute hydrochloric acid at room temperature yields 3 - (17β - hydroxy-11β-methyl-3-oxoestr-5(10)-en - 17α - yl) propionic acid γ-lactone, while reaction with that reagent at steam bath temperature affords 3 - (17β - hydroxy - 11β - methyl-3-oxoestr-4-en-17α-yl) propionic acid γ-lactone.

An alternative method for manufacture of the Δ⁴ compounds of this invention utilizes as starting materials compounds of the following structural formula

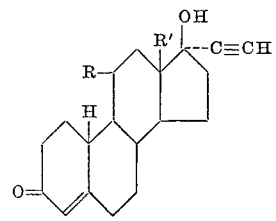

wherein R and R' are as hereinbefore described those materials together with methods for their manufacture are disclosed in U.S. Patent 3,325,520, which issued June 13, 1967. The 3-keto group of those materials is first protected by a ketal function and the resulting protected ketone is submitted to the Grignardation, carboxylation and reduction processes described hereinbefore to yield the corresponding γ lactones. Removal of the ketal function is effected by reaction with a suitable acidic reagent, thus affording the instant γ-lactones. Those processes are exemplified by the reaction of 17α-ethynyl-17β-hydroxy - 11β - methylestr - 4 - en - 3 - one with ethylene gycol and p-toluenesulfonic acid in benzene to afford 17α - ethynyl - 17β - hydroxy - 11β - methylestra - 5 - en-3-one 3-ethylene ketal, which is carboxylated and reduced by the methods described hereinbefore to afford 3 - (17β-hydroxy-3-ethylene - dioxy - 11β - methylestr - 5 - en-17α-yl) propionic acid γ-lactone. Removal of the ketal function by reaction with p-toluene-sulfonic acid affords the aforementioned 3 - (17β - hydroxy - 3 - oxo - 11β - methylestr-4-en-17α-yl) propionic acid γ-lactone.

Equivalent to the instant lactones for the purposes of this invention are the corresponding hydroxy acids and their salts are represented by the following structural formula

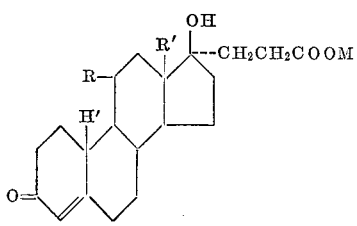

wherein R and $R_2$ are as hereinbefore defined and M represents hydrogen, an alkali metal or alkaline earth metal cation or the ammonium radical.

The instant compounds wherein the 13β-alkyl group contains more than one carbon atom are obtained as dl-mixtures. Resolution of these dl compounds to affords the individual d and l enantiomorphs is conveniently effected by esterification of the hydroxy group with a dibasic acid anhydride such as succinic or phthalic anhydride to afford the corresponding acid ester, which is resolved by means of an optically active amine such as brucine, morphine, quinine, quinidine, strychinine, etc.

The compounds of this invention exhibit valuable pharmacological properties. They are, for example, hormonal agents as is evidenced by their potent progestational properties. They are, moreover, lacking in the sodium-excreting side-effect possessed by related compositions. The compounds of this invention can be administered in any of a number of conventional pharmaceutical forms and also by conventional routes. For oral administration suitable solid forms are pills, powders, capsules, tablets, and the like, and suitable liquid forms are syrups, emulsions, elixirs, suspensions, and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the progestational activity of 3-(3 - oxo - 11β - methyl - 17β-hydroxy-estr-4-en-17α-yl) propionic acid γ-lactone when assayed in the rabbit at subcutaneously administered doses ranging from 0.002 to 0.5 mg. Relative to the standard, i.e., progesterone, it possesses a potency of 2500%.

The specific assay used for determination of progestational activity is a modification of that originally disclosed by Clauberg, C. Zentr. Gynakol., 54, 2757 (1930) and later by Hormone Assay, C. W. Emmens, Academic Press, page 422 (1950). It is described as follows: Female rabbits weighing about 1 kg. are primed daily for 6 days with 5mcg. subcutaneous injections of estradiol (17β). Starting on the day following the last priming injection, the test compound, dissolved or suspended in corn oil, is administered subcutaneously each day for a period of 5 days. A control group of animals is treated with corn oil alone. On the day after the last treatment the animals are sacrificed, a segment of the uterus is taken for histological examination and the degree of arborization of the endometrial glands is graded by the method described by McPhail, M. K., J. Physiol., 83, 145 (1934). The progestational responses are rated on a scale from 1 to 4, a response of at least 2 being required in order for the compound to be rated active.

The invention will appear more fully from the examples which follow. These examples are set forth by way of illustration only and it will be understood that the invention is not to be construed as limited thereby either in sprit or in scope as many modifications both in materials and methods will be apparent from this disclosure to those skilled in the art. In these examples temperatures are given in degrees centigrade (° C.). Quantities of materials are expressed in parts by weight unless otherwise noted.

EXAMPLE 1

To a solution of 2 parts of 17α-ethynyl-11β-methylestra-1,3,5(10)-triene-3,17β-diol in 180 parts of tetrahydrofuran is added, in a nitrogen atmosphere with stirring, 10 parts by volume of ethereal methyl magnesium bromide and stirring is continued for about 24 hours. At the end of that time a stream of carbon dioxide is passed over the stirred mixture for about 23 hours. Acidification of the mixture by means of dilute hydrochloric acid followed by extraction with chloroform affords an organic solution, which is washed with dilute aqueous sodium chloride, then dried over anhydrous magnesium sulfate and concentrated to dryness under reduced pressure. Trituration of the residue with ether and hexane affords crystalline 17β-hydroxy-3-methoxy-11β-methylestra-1,3,5(10) - trien - 17α - yl propiolic acid, melting at about 143–145°.

EXAMPLE 2

A mixture containing 6.6 parts of 17β-hydroxy-3-methoxy-11β-methylestra-1,3,5(10)-trien-17α-yl propiolic acid, 400 parts of methanol and 6 parts of 5% palladium-on-carbon catalyst is shaken at atmospheric pressure and room temperature until two molecular equivalents of hydrogen have been absorbed. The catalyst is removed by filtration and the filtrate is concentrated to dryness under reduced pressure. The resulting residue is triturated first with methanol, then with aqueous methanol to yield crystals of 3-(17β - hydroxy - 3 - methoxy - 11β - methylestra-1,3,5(10)-trien-17α-yl) propionic acid γ-lactone, melting at about 155–156.5°.

EXAMPLE 3

To a solution containing 5.5 parts of 3-(17β-hydroxy-3-methoxy-11β-methylestra-1,3,5(10)-trien - 17α - yl) propionic acid γ-lactone, 10 parts of sodium hydroxide, 80 parts of methanol and 10 parts of water is heated at the reflux temperature for about 5 minutes; approximately 530 parts of benzene is added and the mixture is distilled to dryness under reduced pressure. To the resulting residue there is then added with stirring 1400 parts of liquid ammonia, 630 parts of tetrahydrofuran, 240 parts of tertiary-butyl alcohol and 240 parts of isopropyl alcohol. Stirring is continued while sufficient lithium metal to maintain the blue color of the solution is added portionwise over a period of one hour. At the end of that time the excess lithium is destroyed by the addition of a small quantity of methanol and the mixture is distilled to dryness under reduced pressure. Approximately 1500 parts of water followed by sufficient dilute hydrochloric acid to make the solution acidic are then added with stirring and the resulting aqueous acidic mixture is extracted with chloroform. The chloroform solution is washed successively with water and dilute aqueous sodium bicarbonate, then dried over anhydrous magnesium sulfate and distilled to dryness to produce 3-(3-oxo-11β-methyl-17β-hydroxy-ester-5(10)-en-17α-yl) propionic acid γ-lactone, which exhibits infrared absorption maxima, in chloroform, at about 3.43, 5.68 and 5.84 microns. It is represented by the following structural formula

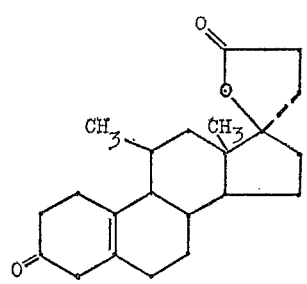

The latter material is dissolved in a solution consisting of 240 parts of methanol and 100 parts by volume of 4 N hydrochloric acid and that solution is heated on the steam bath for about 20 minutes. Cooling of the solution followed by extraction with chloroform affords an organic solution, which is washed with dilute aqueous sodium bicarbonate, dried over anhydrous magnesium sulfate and distilled to dryness under reduced pressure. Trituration of the resulting residue from methanol affords crystals of the crude product, which is purified by recrystallization from acetone, thus affording 3-(3-oxo-11b-methyl-17β-hydroxyestr-4-en-17α-yl) propionic acid γ-lactone, melting at about 231–233°. This compound is represented by the following structural formula

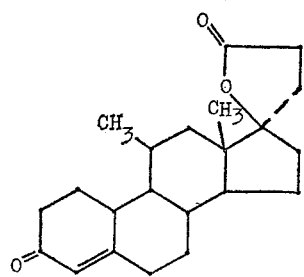

What is claimed is:
1. A compound of the formula

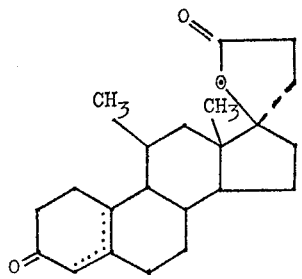

wherein the dotted lines indicate the alternative double bond at the 4(5) or 5(10) position.

2. As in claim 1, the compound which is 3-(3-oxo-11β-methyl-17β-hydroxyestr-4-en-17 - yl)propionic acid γ-lactone.

3. As in claim 1, the compound which is 3-(3-oxo-11β-methyl-17β-hydroxyestr-5(10)-en-17α - yl) propionic acid γ-lactone.

References Cited

UNITED STATES PATENTS 2,918,463  12/1959  Cella.

HENRY A. FRENCH, Primary Examiner

U.S. Cl. X.R.

260—239.55, 397.5, 397.45; 424—241